United States Patent [19]
Grot et al.

[11] Patent Number: 6,005,691
[45] Date of Patent: Dec. 21, 1999

[54] HIGH-SECURITY MACHINE-READABLE HOLOGRAPHIC CARD

[75] Inventors: Annette C. Grot, Cupertino; John S. Hoch, Santa Clara; Robert C. Taber, Palo Alto, all of Calif.

[73] Assignee: Hewlett-Packard Company, Palo Alto, Calif.

[21] Appl. No.: 08/763,500

[22] Filed: Dec. 11, 1996

[51] Int. Cl.$^6$ .............................. G03H 1/00; G02B 5/18; B42D 15/10

[52] U.S. Cl. ............................. 359/2; 359/572; 359/576; 359/33; 430/1; 382/210; 235/457; 235/487; 356/71; 902/25; 283/86; 283/109; 283/901; 283/904

[58] Field of Search .................................. 359/2, 1, 572, 359/576, 32, 33; 430/1; 382/115, 210; 235/457, 487; 356/71; 902/25, 29; 428/161, 172, 354, 916; 283/86, 88, 901, 109, 75, 82, 83, 904

[56] References Cited

U.S. PATENT DOCUMENTS

| | | | |
|---|---|---|---|
| 4,119,361 | 10/1978 | Greenaway | 283/88 |
| 4,204,638 | 5/1980 | Laude | 235/454 |
| 4,717,615 | 1/1988 | Reinhart | 428/161 |
| 5,351,142 | 9/1994 | Cueli | 359/2 |
| 5,513,019 | 4/1996 | Cueli | 359/2 |
| 5,760,961 | 6/1998 | Tompkin et al. | 359/576 |
| 5,838,466 | 11/1998 | Mallik | 359/2 |

OTHER PUBLICATIONS

Tompkin, Wayne R. et al., "Low–Density Diffractive Optical Memories for Document Security", Society of Photo–Optical Instrumentation Engineers, vol. 35, No. 9, Sep. 1996, pp. 2513–2518.

Dausmann, Gunther et al., "Copy Proof Machine Readable Holograms for Security Applications", SPIE, vol. 2659, Jun. 1996, pp. 198–201.

Javidi, Bahram et al., "Optical Processing System Can Foil Counterfeiters", Laser Focus World, Oct. 1996, pp. 75–81.

"DMI's New Imagedisc Combats Counterfeiting of CDS and CD–RIMs", Disc Manufacturing, Inc. Press Release, Feb. 21, 1995.

Descour, M. R., "Mass–Producible Microscopic Computer–Generated Holograms: Microtags", Optics Letters, vol. 21, No. 23, Dec. 1, 1996, pp. 1951–1953.

Feldman, Michael R., "Iterative Encoding of High–Efficiency Holograms for Generation of Spot Arrays", Optics Letters, vol. 14, No. 10, May 15, 1989, pp. 479–481.

Vasara, Antti et al., "Binary Surface–Relief Gratings for Array Illumination in Digital Optics", Applied Optics, vol. 31, No. 17, Jun. 10, 1992, pp. 3320–3336.

"The Holographic Process Begins with Design/Artwork Origination", Holographic Dimensions, Inc.. May 12, 1996.

McGrew, Steve, "Countermeasures Against Hologram Counterfeiting", New Light Industries Ltd., 1996.

"Using Embossed and Photo–Polymer Holograms in Low Production Runs", HoloBank Stock Image Hologram Collection.

Brown, Kevin G. et al., "Counterfeit Proof and Machine Readable Holographic & ensp Technology—Verigram Security Systems", International Hologram Manufaturers Association (IHMA) Security Conference.

*Primary Examiner*—Jon Henry
*Attorney, Agent, or Firm*—Ian Hardcastle

[57] ABSTRACT

The hologram card generates a hologram image in response to an illumination light beam. The hologram card comprises a substrate of a first plastic material having a first refractive index. The substrate has a contoured surface. The contoured surface is formed to include localized topological features constituting a diffractive optical element. The diffractive optical element is structured to generate a hologram image when illuminated by the illumination light beam. The hologram card also comprises a protective layer of a second plastic material having a second refractive index that differs from the first refractive index by less than 0.2. The protective layer covers the contoured surface of the substrate. The protective layer is chemically bonded to, and directly contacts, at least the topological features constituting the diffractive optical element.

18 Claims, 3 Drawing Sheets

HIGH-SECURITY MACHINE-READABLE HOLOGRAPHIC CARD

FIELD OF THE INVENTION

The invention relates to machine-readable hologram cards and, in particular, to machine-readable hologram cards that are highly resistant to counterfeiting.

BACKGROUND OF THE INVENTION

Machine-readable hologram cards have recently been proposed for use as financial transaction cards and in other applications in which security is important. Such cards encode alpha and numeric data using multiple diffractive optical elements (DOEs). A major advantage of such encoding is that the data stored in the card cannot be read by the user, or by an unsophisticated counterfeiter.

FIG. 1A is a perspective view of a machine-readable hologram card 1. Such a machine-readable hologram card and a card reader for such a card is described in U.S. Pat. No. 4,204,638 of Laude, and by Tompkin et al. in *Low-Density Diffractive Optical Memories for Document Security*, 35 OPT. ENG., 2513–2518 (September 1996). In the machine-readable hologram card 1, the diffractive optical element (DOE) 3 is located on the reading surface 5 of the card. In the example shown, the data storage capacity of the card is increased using multiple DOEs arranged along the track 7.

FIG. 1B shows a cross-sectional view of a small part of a machine-readable hologram card 1 taken through part of the DOE 3. The DOE 3 includes the thin plastic substrate 17 having the irregularized diffraction grating 11 formed in its surface 13. The depth of the diffraction grating is exaggerated in the figure to show the contours of the diffraction grating more clearly. The diffraction grating is typically formed by embossing the substrate 17. The surface 13 is covered by the thin reflective layer 15. The reflective layer is normally a thin layer of metal deposited on the surface 13 before or after the surface is embossed. The DOE is affixed to the reading face 5 of the substrate 9 of the card 1 by a suitable adhesive.

FIG. 2 shows a typical card reader for reading the machine-readable hologram card shown in FIGS. 1A and 1B. A collimated light beam from the laser 21 is directed by the mirror 23 onto the DOE 3 on the reading surface 5 of the machine-readable hologram card 1. The DOE generates a hologram image by diffracting the collimated light beam. The irregularities formed in the diffraction grating 11 cause the diffraction grating to generate a number of satellite beams at characteristic angles and with characteristic intensities. A detector is provided in each of the anticipated paths of the main and satellite diffracted light beams to detect the intensity of the diffracted light beam. The detectors 25, 27, 29 and 31 are shown as examples. The electrical output levels from the detectors are analyzed by the electronic circuit 33 to determine whether the card 1 inserted into the card reader generates the correct combination of detector output levels, i.e., the same combination of output levels as that generated by a genuine card. Moreover, the absence or presence of one or more of the detector outputs may be used to represent binary data that can be extracted by the electronic circuit. The data encoded in successive DOEs disposed along the track 7 are read out by transporting the card in the direction indicated by the arrow 35.

Despite the potential for greater security offered by encoding data as DOEs, known machine-readable hologram cards are not impossible to counterfeit. The use of a limited number of discrete detectors requires that the diffraction gratings generate a relatively simple pattern of diffracted light beams. This requires that the diffraction grating itself be relatively simple. A hologram card using diffraction grating-type DOEs can be counterfeited in one of two main ways. The first main way involves cloning the DOEs taken from a valid, genuine card. The genuine DOEs are used as templates to generate masters from which multiple counterfeit DOEs and corresponding hologram cards can be manufactured.

Cloning involves delaminating the DOEs taken from a genuine hologram card to expose the diffraction grating 11 in the surface 13 of the DOE. It is possible to delaminate the conventional DOE mechanically because the adhesion between the reflective layer 15 and both the card substrate 9 and the DOE substrate 17 is relatively weak. Thus, the DOE can be simply pulled off the card substrate to expose the surface 13. Alternatively, the DOE can be delaminated chemically by dissolving the reflective layer using a chemical that does not attack the DOE substrate 17. Because the metal of the reflective layer is chemically very different from the plastic of the substrates of both the card and the DOE, finding a suitable chemical is not difficult. Once the surface 13 has been exposed, known electroplating methods can be used to derive a master from the surface 13. The master can then be used as a stamper to make the DOEs for multiple counterfeit machine-readable hologram cards using conventional embossing techniques.

The second main way of counterfeiting a machine-readable hologram card is to make the master for each DOE from scratch, and then to use a known method to derive from the master a stamper that can then be used to manufacture the DOEs for multiple counterfeit cards using conventional embossing techniques. In conventional machine-readable hologram cards that are designed to be read using the apparatus shown in FIG. 2, the diffraction gratings in the DOEs have topographical features with linear dimensions of several microns. The masters for patterns with such dimensions can be printed with sufficient resolution using high-resolution printers of the type commonly used for typesetting.

A paper by Steve McGrew entitled *Countermeasures Against Hologram Counterfeiting,* http://www.iea.com/~nli/publications/countermeasures.html, suggests that delaminating metallized holograms could be made more difficult by making the holograms "multiply connected." The paper explains that a multiple connectivity means that the hologram is composed of dots or else is punched full of holes. The figure illustrating a "multiply connected" hologram is not published. However, the description indicates that the active areas of a "multiply connected" hologram will still include an aluminum layer. Although multiply connecting the hologram will make the hologram more difficult to counterfeit, retaining the aluminum layer provides an avenue through which the embossed surface can still be accessed. Moreover, the need to pattern the aluminum layer complicates the process of manufacturing such holograms.

Accordingly, there is a need for a machine-readable hologram card with considerably higher security than known machine-readable hologram cards. The DOEs in such a card should generate a more complex hologram image than the DOEs of known hologram cards, and the more complex hologram image should be capable of easy detection. Moreover, such a card should be simple to manufacture but should be very difficult to counterfeit either by cloning or by making a master from scratch. There is also a need for an apparatus capable of reliably reading such a high-security machine-readable hologram card.

SUMMARY OF THE INVENTION

The invention provides a high-security, machine-readable hologram card that generates a hologram image in response to an illumination light beam. The hologram card comprises a substrate of a first plastic material having a first refractive index. The substrate has a contoured surface. The contoured surface is formed to include localized topological features constituting a diffractive optical element. The diffractive optical element is structured to generate a hologram image when illuminated by the illumination light beam. The hologram card also comprises a protective layer of a second plastic material having a second refractive index that differs from the first refractive index by less than 0.2. The protective layer covers the contoured surface of the substrate. The protective layer is chemically bonded to, and directly contacts, at least the topological features constituting the diffractive optical element.

Chemically bonding the protective layer in direct contact with the topological features formed in the substrate greatly increases the difficulty of delaminating the hologram card to counterfeit it. The chemical bonds between the substrate and the protective layer helps prevent both mechanical and chemical delamination. Chemical delamination is further deterred the first plastic material and the second plastic material having similar properties with respect to etchants and solvents. This makes it difficult to dissolve one of the layers without destroying the topological features formed in the other layer.

The refractive index difference between the substrate and the protective layer is small. The resulting small diffractive efficiency makes the hologram image difficult to read. However, the hologram image can be read reliably notwithstanding the small diffractive efficiency by structuring the diffractive optical element to generate the entire hologram image angularly separated from the specular reflection of the illumination light beam by the contoured surface.

The diffractive optical element is preferably also structured to generate the hologram image to include light spots arranged in a two-dimensional array.

DETAILED DESCRIPTION OF THE INVENTION

Figure 3A:
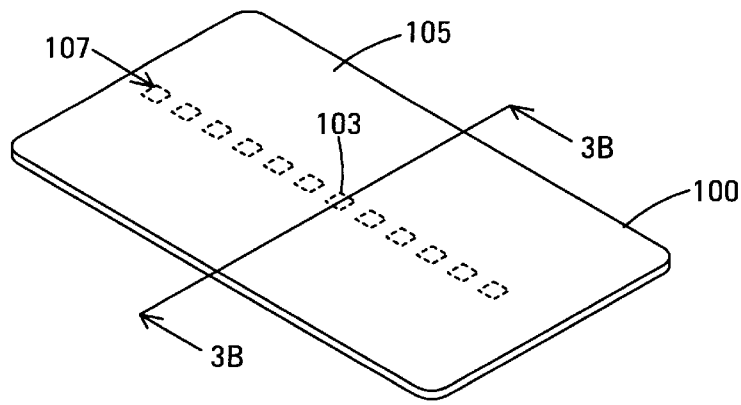
FIG. 3A is a perspective view showing a machine-readable hologram card according to the invention.

FIG. 3A is a perspective view of a machine-readable hologram card 100 according to the invention. The diffractive optical element (DOE) 103, is located beneath the reading surface 105 of the card. Also, in the example shown, the data storage capacity of the card is increased by using multiple DOEs arranged along the track 107. The data storage capacity may be further increased by additional DOEs arranged in tracks (not shown) parallel to the track 107. The outlines of the DOEs are indicated by broken lines because, as will be discussed in more detail below, the DOEs are typically invisible to the naked eye. The DOE 103 will be described in more detail below.

Figure 3B:
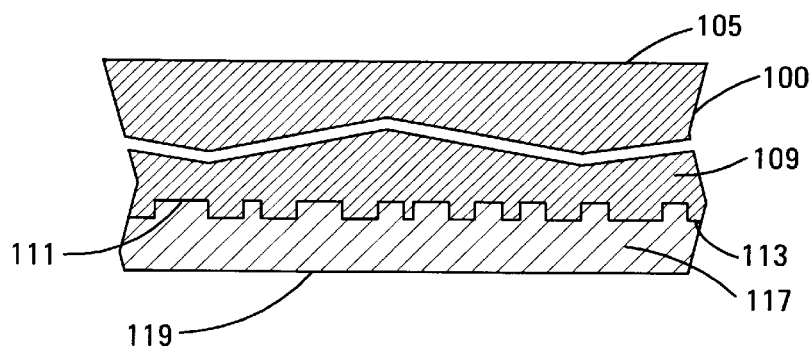
FIG. 3B is a cross sectional view through the machine-readable hologram card according to the invention shown in FIG. 3A in the vicinity of the diffractive optical element.

FIG. 3B shows a cross-sectional view of a small part of a machine-readable hologram card 100 according to the invention, taken through part of the DOE 103. The substrate 109 constitutes most of the bulk of the card. The reading surface 105 of the substrate is smooth and is normally the face of the card that is illuminated when the card is normally read. However, the card may alternatively be read though the protective layer 117. The surface of the substrate opposite the reading surface is the contoured surface 113. Topological features 111 are formed in a number of localized areas of the contoured surface. Each of the localized areas in which the topological features are formed constitutes one DOE. The depth of the topological features is exaggerated in the figure to show the topological features more clearly. Outside the DOEs, the contoured surface may be smooth. The DOEs will be described in more detail below.

The plastic used to form the substrate 109 should be capable of accurately reproducing the topological features of the contoured surface. The plastic should preferably be transparent or partially absorbing at the wavelength of the light used to read the DOEs, but should not be translucent or diffusing. However, if the card is read through the protective layer 117, the substrate may be totally absorbing. Suitable plastics include polycarbonate, polyester, polystyrene and acrylic. The substrate may be injection molded using a mold that defines the topological features 111 of the contoured surface 113. An injection molding process similar to that used to manufacture compact discs may be used. Alternatively, the substrate may be formed by embossing suitable plastic materials using a stamper that defines the topological features of the contoured surface. The substrate may also be formed by casting plastic using a suitable mold.

The protective layer 117 covers the contoured surface 113 of the substrate 109. In particular, the protective layer directly contacts and is chemically bonded to the topological features constituting the DOEs, for example the DOE 103. The protective layer preferably also directly contacts and is chemically bonded to the contoured surface outside the DOEs. The surface of the protective layer remote from the contoured surface is indicated by the reference numeral 119.

The protective layer 117 may be a layer of a liquid photopolymer deposited on the contoured surface and then subject to UV radiation. The UV hardens the photopolymer to form the protective layer. For example, the liquid photopolymer may be spun onto the contoured surface and then subject to UV radiation. Additional information (not shown) may then be screen printed onto the surface 119 of the protective layer.

The material of the protective layer 117, when hardened, preferably has two important properties: (a) it is chemically as similar as possible to the material of the substrate, consistent with the refractive index of the protective layer being different from that of the substrate; and (b) it bonds to the material of the substrate with a bond strength similar to the bulk strength of the materials of the protective layer and the substrate.

The structure of the machine-readable hologram card 100 according to the invention makes the hologram card difficult to counterfeit. The direct contact and chemical bonding between the protective layer 117 and the topological features 111 formed in the contoured surface 113 of the substrate 109 makes the card 100 difficult to delaminate, either mechanically or chemically. Mechanical delamination is prevented by forming the protective layer and the substrate from materials that bond to one another with an adhesive strength comparable with their bulk strengths. There are many suitable plastics that can be used for the protective layer that meet this criterion. The adhesive strength that can be achieved between two such plastic materials can be far greater than the adhesive strength between metal and plastic.

Using chemically-similar materials for the protective layer 117 and for the substrate 109 also makes the machine-readable hologram card 100 difficult to delaminate chemically. Using chemically-similar materials prevents the protective layer and the substrate from being separated from one another chemically without the contoured surface 113 in the substrate and the negative contoured surface formed in the protective layer being destroyed in the process.

Placing the protective layer 117 in direct contact with the topological features 111 formed in the contoured surface 113 of the substrate 109 causes the reflectivity of the DOEs to depend on the refractive index difference between the materials of the substrate and the protective layer. If chemically-similar materials are used for the protective layer and the substrate, as is desirable to make chemical delamination difficult, the refractive index difference at the contoured surface will be small. Consequently, the reflectivity of the contoured surface of the DOEs will be very low.

Figure 1A:
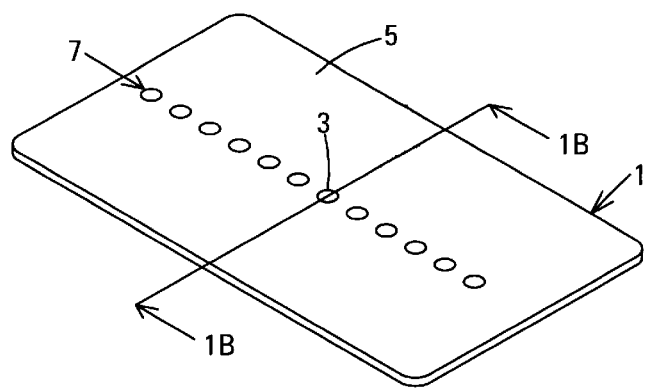
FIG. 1A is a perspective view showing a conventional machine-readable hologram card.
Figure 1B:
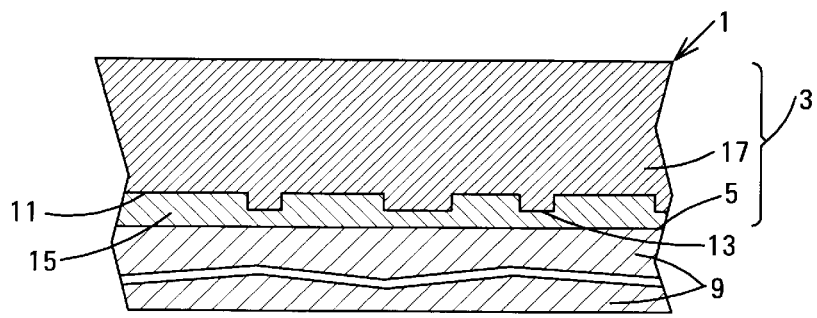
FIG. 1B is a cross sectional view through the conventional machine-readable hologram card shown in FIG. 1A in the vicinity of the diffractive optical element.
Figure 2:
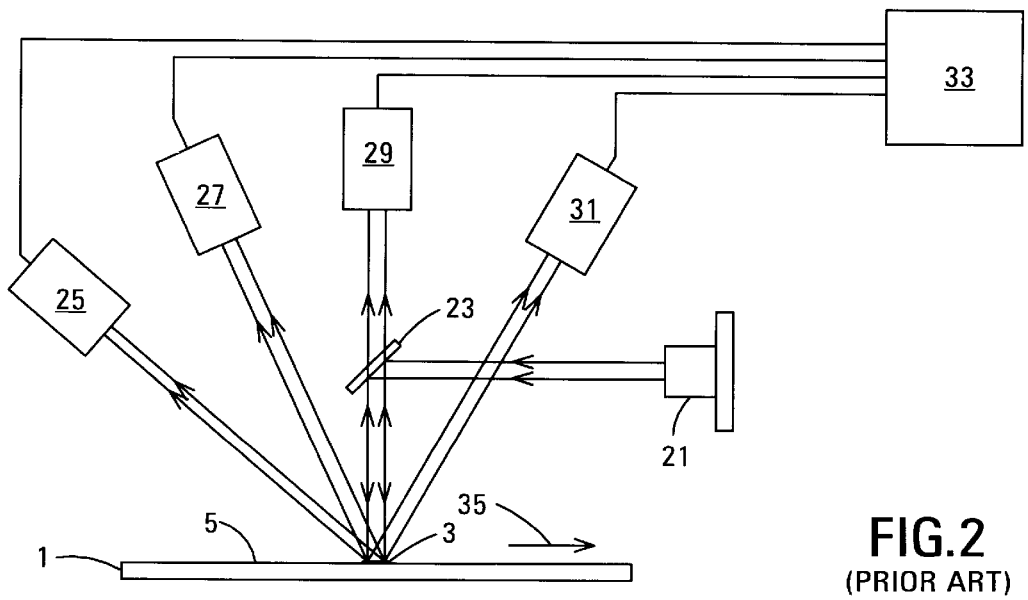
FIG. 2 is a side view of a card reader for reading the conventional machine-readable hologram card shown in FIG. 1A.

A low reflectivity at the contoured surface 113 reduces the diffraction efficiency of the DOE 103. A low diffraction efficiency makes the DOE difficult to read accurately because the intensity of the hologram image generated by the DOE will be low. This makes it difficult to read the hologram image accurately because the low intensity of the image makes the reading process susceptible to optical noise. The optical noise reduces the contrast of the hologram image. Noise sources include background scattering, but the main source of optical noise is the light specularly reflected by the various surfaces of the card and the card reader. Conventional machine-readable hologram cards use a reflective layer, for example, the metal reflective layer 15 shown in FIG. 1B, to increase the diffractive efficiency of the DOE but this improves the readability of the DOE at the expense of making the hologram card easier to delaminate.

Although the small difference in refractive index between the substrate 109 and the protective layer 117 makes the hologram card 100 difficult to read, the small difference in refractive index provides the advantage of increasing the difficulty of counterfeiting the hologram card. The reflectivity of the contoured surface 113 is so low that the DOEs, such as the DOE 103, cannot be seen by the naked eye, even though the DOEs are typically large enough to be seen. Nor can the DOEs be seen under a microscope. The DOEs can only be detected by a suitable card reader. Thus, sophisticated equipment is required to determine whether a card even includes DOEs and, if so, where the DOEs are located.

Despite the small difference in refractive index between the substrate 109 and the protective layer 117, a suitable card reader can read the machine-readable holographic card 100 reliably because the DOE 103 is formed so that the light it diffracts to form the hologram image is angularly separated from the light specularly reflected by the various surfaces of the card. The angular separation between the hologram image and the specularly-reflected light enables the hologram card 100 to be read reliably because it enables the detector for the hologram image to be located so that the hologram image and the specularly-reflected light fall on physically separated areas of the detector. The angular separation may be such that the specularly-reflected light may bypass the detector, as in the preferred embodiment of the card reader for reading the machine-readable hologram card 100 according to the invention, to be described below with reference to FIGS. 5A and 5B.

Suitable diffraction angles between the specularly-reflected light beam and the diffracted light beam lie in the range of about 5° and 70°. The optimum choice of diffraction angle depends on such factors as the characteristics of the detector, the diffractive efficiency of the DOEs, the physical layout of the card reader, the desired dimensions of the topological features of the contoured surface, as will be discussed in more detail below, and the wavelength of the illumination beam. In a practical embodiment, diffraction angles of a few tens of degrees were used.

Providing a physical separation at the detector between the holographic image and the specular reflections from the card enables the card to be read reliably even when the DOE has a diffraction efficiency as low as about $1 \times 10^{-4}$. The diffraction efficiency of the DOE depends on factors including the reflectivity of the contoured surface and the depth of the topological features formed in the contoured surface. If the topological features have a depth of about 100 nm, and the substrate has a refractive index of about 1.5, a diffraction efficiency of about $1 \times 10^{-4}$ is obtained when the refractive index of the protective layer differs from that of the substrate by about 0.05.

Topological features with dimensions appropriate for a diffraction angle of zero will form a hologram image if illuminated at a non-zero angle of incidence, but the hologram image will be difficult to read reliably. Therefore, it is preferred that, when the DOE 103 is formed so that the light diffracted to form the hologram image is angularly separated from the light specularly reflected by the card, the dimensions of the topological features formed in the contoured surface be reduced approximately in proportion to the diffraction angle between the specularly reflected light and the diffracted light. A reference in this disclosure to the dimensions of the topological features refers to the dimensions of the topological features in the plane of the contoured surface unless the depth of the topological features is specifically mentioned.

Reducing the dimensions of the topological features formed in the contoured surface 113 as the diffraction angle is increased is also desirable because it further increases the resistance of the card to counterfeiting. This is because the dimensions of the topological features can be reduced to a range in which the master for manufacturing the card cannot be made with sufficient accuracy using a typesetting printer. Such small topological features also make it more difficult to clone the card successfully even if the contoured surface 113 can somehow be successfully exposed. Small errors in the topology of the contoured surface will cause the spots in the hologram image to overlap, which leads to errors in the detection processing and rejection of the counterfeit card.

The DOEs, such as the DOE 103, are made from master generated synthetically using a computer. The computer determines the shape of the topological features that, when formed in the contoured surface 113 and illuminated by an illumination light beam having the same characteristics as the light beam of the corresponding card reader, will diffract the illumination light beam at the desired diffraction angle relative to the specular reflection of the illumination light beam to produce the desired hologram image. The preferred hologram image is composed of a rectangular array of small elements, each of which may include a light spot, or may lack a light spot. The DOE is designed to generate the hologram image when illuminated with a converging illumination light beam. The converging light beam causes the size of the light spots to be minimized at a point in space that preferably coincides with the location of the detector for the hologram image.

The intensity of each element of the hologram image can represent the state 0 or 1 of a binary number. Consequently, each DOE can represent multi-bit binary numbers, or multiple alphanumeric characters each represented by a multi-bit binary number. Using a converging light beam to minimize the size of the elements of the hologram image at the detector increases the number of elements that can be included in an image of a given size, and hence increase the data representing capacity of each DOE. Moreover, increasing the number of elements that can be included in a hologram image of a given size increases the security of the card, because complex security codes can be represented by an image composed of many elements. Moreover, the simple binary detection of the hologram image enables the security codes to be read easily by the appropriate card reader.

Figure 4A:
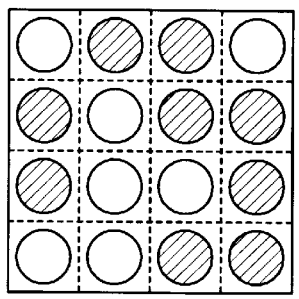
FIG. 4A shows a typical hologram image generated by the diffractive optical element of the machine-readable hologram card according to the invention.
Figure 4B:
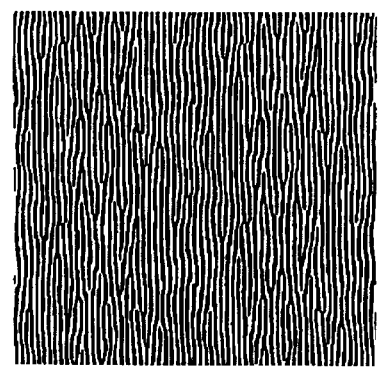
FIG. 4B shows an example of the diffractive optical element of the machine-readable hologram card according to the invention.

Techniques that may be used for generating the masters for the DOEs are described by A. Vasara et al., *Binary Surface Relief Gratings for Array Illumination in Digital Optics*, 31 APPL. OPT. 3320–3336 (1992), and M. R. Feldman et al., *Iterative Encoding for High-Efficiency Holograms for Generation of Spot Arrays*, 14 OPT. LETT. 479–481 (1989). The disclosures of both papers are incorporated in this disclosure by reference. FIG. 4A shows an example of a hologram image composed of a two-dimensional array of elements. FIG. 4B shows an example of a computer-generated DOE that will generate a hologram image of the type shown in FIG. 4A.

The topological features 111 shown in FIG. 3B are simple binary pits, i.e., the pits formed in the contoured surface 113 to create the topological features have only one possible depth. Alternatively, more complex topological features may be used. The topological features can be formed using pits that can have more than one possible depth. The topological features can also be formed using analog pits. Protuberances from the contoured surface 113 may also be used to form the topological features.

In one practical example of the machine-readable hologram card according to the invention, a hologram card was made using a polycarbonate substrate 109. Polycarbonate has a refractive index of 1.57 in the wavelength range of 700–900 nm. A surface treatment using chromic sulphuric acid was performed to increase the adhesion between the substrate and the protective layer 117. A layer of Norland™ optical adhesive no. 65 was spun onto the contoured surface of the substrate as the protective layer and was cured using ultra-violet light. The protective layer had a refractive index of about 1.52. When the resulting machine-readable hologram card was read, the DOEs formed in the contoured surface 113 of the substrate were readable with high accuracy. Attempts at mechanical delamination were unsuccessful. In a variation, the surface treatment was omitted, and a solvent such as acetone was added to the optical adhesive to increase adhesion of the protective layer to the polycarbonate substrate.

In another practical example, a hologram card was made using a polyester substrate 109. A layer of a single-component modified acrylate-methacrylate photo polymer, Summers™ Optical Adhesive SK9, was spun onto the contoured surface and was cured using ultra-violet light. The resulting protective layer 113 had a refractive index that differed from that of the substrate by about 0.05. DOEs formed in the contoured surface of the substrate were readable with high accuracy. Attempts at mechanical delamination proved unsuccessful.

Doping can be used to provide the required refractive index difference between substrate and protective layer materials that are otherwise chemically very similar. Using materials that are chemically very similar minimizes the possibility of the materials being capable of chemical delamination. A solvent that would dissolve the protective layer will also dissolve the substrate, and destroy the topological features of the contoured surface of the substrate. Doping could be used when the substrate material is acrylic and the protective layer is an acrylate photopolymer. The refractive index of the protective layer could be modified by adding a suitable dopant such as titanium dioxide ($TiO_2$).

Figure 5A:
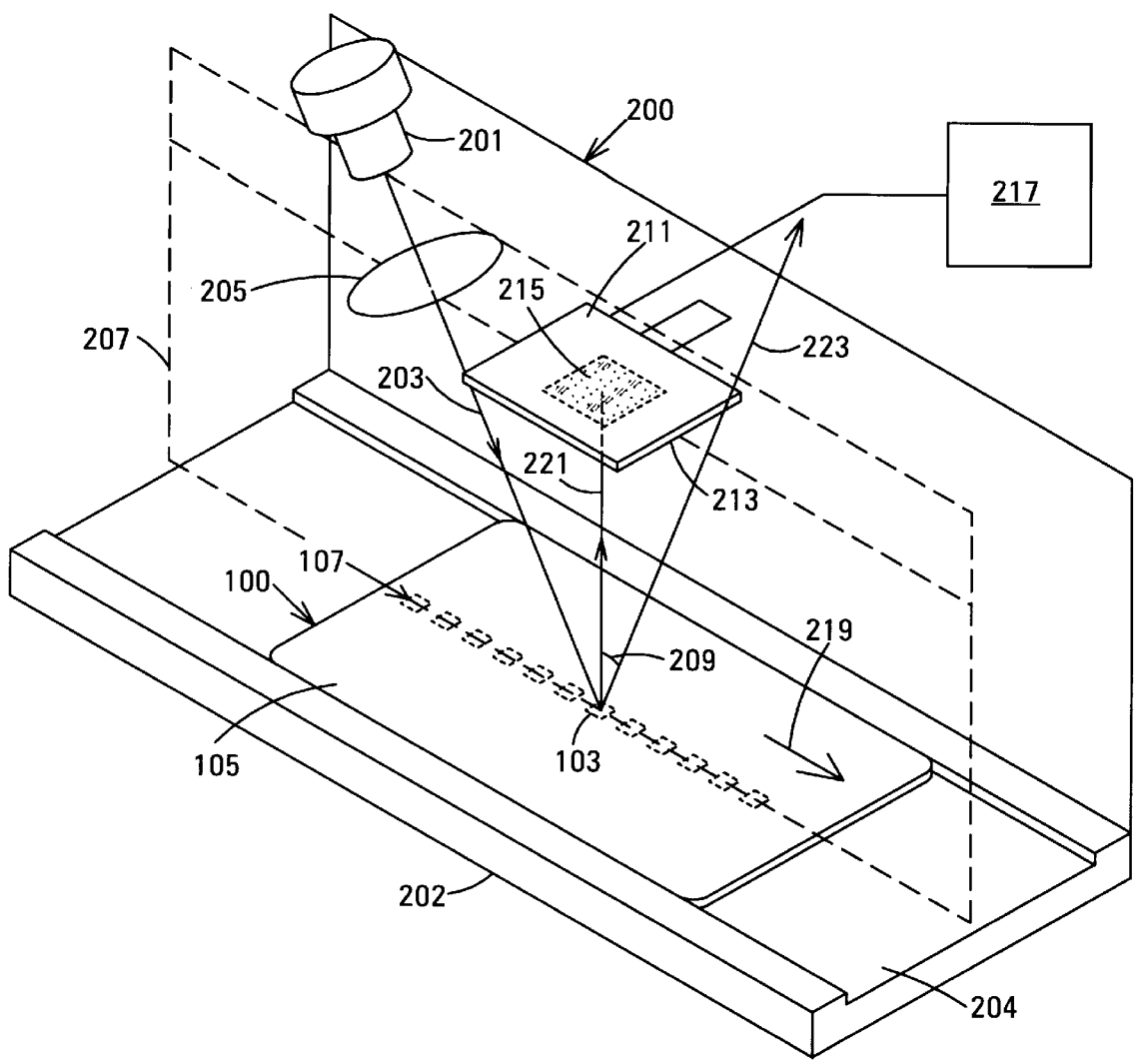
FIG. 5A is a perspective view of the card reader for reading the machine-readable hologram card according to the invention.
Figure 5B:
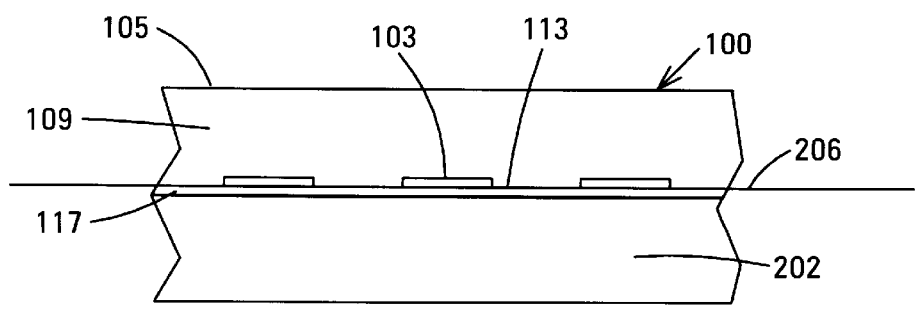
FIG. 5B is a partial side view of the card reader shown in FIG. 5A.

The card reader 200 for reading the machine-readable hologram card according to the invention will now be described with reference to FIG. 5A, which is a schematic perspective view of the apparatus, and FIG. 5B, which shows a cross-sectional view of part of the card reader and the machine-readable hologram card 100 according to the invention. FIGS. 5A and 5B show the card reader reading the DOE 103 formed in the contoured surface 113 of the machine-readable hologram card as an example of reading the DOEs disposed along the track 107.

The card reader includes the card guide 202 that defines the lateral position of the hologram card 100 relative to the main components of the card reader, i.e., the light source 201, the lens 205 and the image sensor 211. The card guide is shown as including the channel 204 through which the card is moved by a suitable mechanism (not shown) in the direction indicated by the arrow 219 to enable the DOEs along the track 107 to be read. Alternatively, the card may be manually swiped through the channel 204. The channel has the same width as the width of the card. Other suitable card guiding structures may be used to define the lateral position of the hologram card in the card reader. The card reader also defines the reference plane 206. The reference plane coincides with the plane of the contoured surface 113 of the hologram card 100 when the card is mounted in the card guide 204. The reference plane 206 is shown in FIG. 5B.

The light source 201 generates the light beam 203. The light beam passes through the lens 205 and falls at an oblique angle on the reading surface 105 of the card. The focal length of the lens is chosen relative to the distance between the light source and the lens and the total distance between the lens and the detector 211 such that, when the card reader reads the card, the light beam 203, following diffraction by the DOE, is focused on the active surface 213 of the detector 211.

The light source 201 and the lens 205 are mechanically coupled to the card guide 202 and are located so that their centers lie in the plane 207. The plane 207 through the center of the track 107, and is disposed perpendicular to the reference plane 206. This locates the light beam 203 in the plane 207. In the embodiment shown, the light source and lens are arranged so that they project the illumination light beam 203 onto the reference plane 206 at a non-zero angle of incidence. The illumination light beam is specularly reflected by the hologram card 100 to form the specularly-reflected light beam 223. The specularly-reflected light beam is reflected at a non-zero angle of reflection equal to the angle of incidence.

The detector 211 is mechanically coupled to the card guide 202. The detector is mounted to receive the diffracted light beam 221 diffracted by the DOE 103. As noted above, the DOE diffracts the illumination light beam 203 so that the diffracted light beam 221 is angularly separated from the specularly-reflected light beam 223 by the predetermined diffraction angle 209. In the embodiment shown in FIG. 5A, the diffracted light beam 221 is diffracted so that it extends normally to the contoured surface 113 of the hologram card 100. The detector is mounted so that its plane is perpendicular to the diffracted light beam 221.

The angular separation between the diffracted light beam 221 and the specularly-reflected light beam 223 results in a critical spacing between the reference plane 206 and the detector 211. At a spacing greater than the critical spacing, the area of the detector illuminated by the specularly-reflected light beam is physically separated from the area of the detector on which the hologram image 215 is formed. The area of the detector on which the hologram image is formed will be called the image detection area of the detector. The minimum separation between the two areas of the detector required to ensure reliable detection of the hologram image 215 depends on the intensity of the hologram image relative to the intensity of the specular reflection, and also depends on the optical and electrical crosstalk between the two areas of the detector. As noted above, the intensity of the hologram image depends on the diffractive efficiency of the DOE 103. Thus, to ensure reliable detection of the hologram image, the detector is mounted at a spacing from the reference plane 206 greater than the critical spacing.

In the embodiment shown in FIG. 5A, the spacing between the detector 211 and the reference plane 206 is such that the specularly-reflected light beam 223 does not fall on the detector at all. This arrangement minimizes the possibility of the specularly-reflected light beam interfering with detection of the hologram image 215. If the spacing between the detector and the reference plane were reduced from that shown, part of the specularly-reflected light beam would then fall on the detector.

The detector 211 is preferably a CCD, but other suitable types of detector, such as an array of photodiodes, may be used. The detector generates a detection signal in response to the hologram image and feeds this signal to the decoding circuit 217. For example, if the detector is a CCD, the detection signal is a video signal. Circuits for decoding information represented by light intensity differences from a video signal are known and will not be described here. The decoding circuit can be configured to determine whether the hologram image is the hologram image generated by a genuine hologram card, and may additionally or alternatively be configured to extract the data encoded in the hologram image.

In a practical embodiment of the card reader 200, a semiconductor laser that generated light in the near infra-red was used as the light source 201. Alternatively, an LED, a pinhole illuminated by an incandescent lamp, or any other source capable of being imaged to form a small spot may be used as the light source 201. A CCD of a type used in video cameras was used as the detector 211.

In an alternative embodiment of the card reader 200, the illumination light beam 203 illuminates the machine-readable hologram card 100 at an angle of incidence of zero or close to zero. In this case, the hologram card 100 reflects the specularly-reflected light beam back to the light source. The hologram card also generates a diffracted light beam by diffracting the illumination light beam through a diffraction angle relative to the specularly-reflected light beam equal and opposite to the diffraction angle 209 shown in FIG. 5A. Thus, when the light source 201 and lens 205 are relocated to set the angle of incidence of the illumination beam to zero, the detector 211 must also be relocated to intersect the diffracted light beam. This would locate the detector in the path of the light beam 223 shown in FIG. 5A. Accordingly, in this alternative embodiment, the angular separation between the diffracted light beam and the specularly-reflected light beam is the same as in the embodiment shown in FIG. 5A.

Operation of the card reader 200 will now be described. The machine-readable hologram card 100 is placed in the channel 204 of the card guide 202. The channel aligns the DOEs on the card with the illumination light beam 203 and the detector 211. The illumination light beam illuminates a small area of the reading surface 105 and the contoured surface 113 of the card. This area is greater than the area of the DOE 103. The DOEs arranged along the track 107 are designed so that when each of them is illuminated with the illumination beam 203, the illuminated DOE diffracts part of the light beam 203 to generate the diffracted light beam 221. The diffracted light beam 221 projects from the contoured surface to produce the hologram image 215 on the active surface 213 of the detector 211. In the embodiment shown in FIG. 5A, the diffracted light beam 221 projects normally, i.e., perpendicularly, from the contoured surface towards the detector.

The hologram image 215 is composed of a two-dimensional array of elements, each of which may have a high intensity or a low intensity. A 4×4 array of elements is shown as the hologram image 215 as an example.

The hologram card 100 specularly reflects part of the light beam 203 as the specularly-reflected light beam 223. The spacing of the detector 211 from the reference plane 206 is such that, if the specularly-reflected light beam 223 falls on the detector at all, it does not fall on the image detection area of the detector, i.e., the area of the detector on which the hologram image 215 is formed. This enables the detector to detect the low intensity hologram image formed by the diffracted light beam 221 without interference from the specularly-reflected light beam 223.

Although this disclosure describes illustrative embodiments of the invention in detail, it is to be understood that the invention is not limited to the precise embodiments described, and that various modifications may be practiced within the scope of the invention defined by the appended claims.

We claim:

1. A high-security, machine-readable hologram card that generates a hologram image in response to an illumination light beam, the hologram card comprising:

a substrate of a first plastic material having a first refractive index, the substrate having a contoured surface, the contoured surface being formed to include localized topological features constituting a diffractive optical element, the diffractive optical element being structured to generate the hologram image when illuminated by the illumination light beam; and a protective layer of a second plastic material having a second refractive index that differs from the first refractive index by less than 0.2, the protective layer covering the contoured surface of the substrate, the protective layer being chemically bonded to, and directly contacting, at least the topological features constituting the diffractive optical element.

2. The hologram card of claim 1, in which the second plastic material and the first plastic material have similar properties with respect to etchants and solvents.

3. The hologram card of claim 2, in which one of the first plastic material and the second plastic material includes:

the other of the first plastic material and the second plastic material; and a refractive index modifying dopant.

4. The hologram card of claim 1, in which the second refractive index differs from the first refractive index by less than 0.05.

5. The hologram card of claim 1, in which the diffractive optical element is structured to generate the entire hologram image angularly separated from a specular reflection of the illumination light beam by the contoured surface.

6. The hologram card of claim 5, in which the diffractive optical element is structured to generate the hologram image angularly separated from the specular reflection of the illumination light beam by an angle in a range from about 5 degrees to about 70 degrees.

7. The hologram card of claim 1, in which the diffractive optical element is structured to generate the hologram image to include light spots arranged in a two-dimensional array.

8. The hologram card of claim 3, in which the diffractive optical element is structured to generate the entire hologram image angularly separated from a specular reflection of the illumination light beam by the contoured surface.

9. The hologram card of claim 8, in which the diffractive optical element is structured to generate the hologram image angularly separated from the specular reflection of the illumination light beam by an angle in a range from about 5 degrees to about 70 degrees.

10. The hologram card of claim 3, in which the diffractive optical element is structured to generate the hologram image to include light spots arranged in a two-dimensional array. refractive index by less than 0.05.

11. The hologram card of claim 4, in which the diffractive optical element is structured to generate the entire hologram image angularly separated from a specular reflection of the illumination light beam by the contoured surface.

12. The hologram card of claim 11, in which the diffractive optical element is structured to generate the hologram image angularly separated from the specular reflection of the illumination light beam by an angle in a range from about 5 degrees to about 70 degrees.

13. The hologram card of claim 4, in which the diffractive optical element is structured to generate the hologram image to include light spots arranged in a two-dimensional array.

14. The hologram card of claim 1, in which one of the first plastic material and the second plastic material includes:

the other of the first plastic material and the second plastic material; and a refractive index modifying dopant.

15. The hologram card of claim 14, in which the diffractive optical element is structured to generate the entire hologram image angularly separated from a specular reflection of the illumination light beam by the contoured surface.

16. The hologram card of claim 15, in which the diffractive optical element is structured to generate the hologram image angularly separated from the specular reflection of the illumination light beam by an angle in a range from about 5 degrees to about 70 degrees.

17. The hologram card of claim 14, in which the diffractive optical element is structured to generate the hologram image to include light spots arranged in a two-dimensional array.

18. The hologram card of claim 1, in which:

the diffractive optical element is structured to generate the entire hologram image angularly separated from a specular reflection of the illumination light beam by the contoured surface, the hologram image being angularly separated from the specular reflection by a separation angle; and the diffractive optical element includes topological features having dimensions smaller by an amount proportional to the separation angle than dimensions that would generate the hologram image with the same size at a zero diffraction angle.

* * * * *